Figure 1:
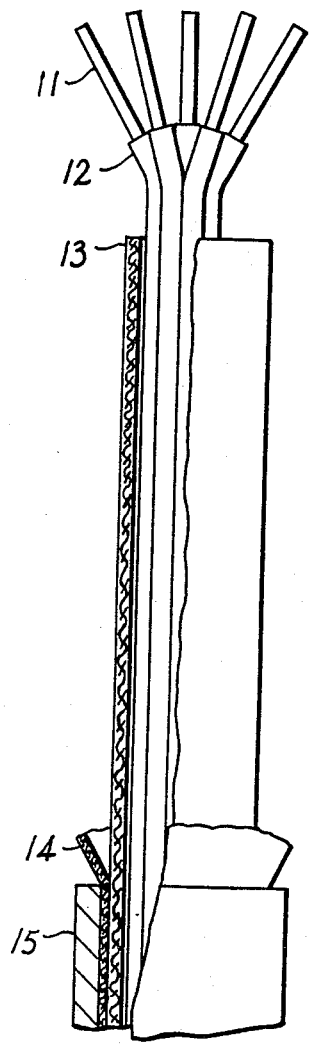

United States Patent [19]

Warkentine

[11] 4,264,129

[45] Apr. 28, 1981

[54] FIBER BUNDLE TERMINATION

[75] Inventor: Ronnie L. Warkentine, Plano, Tex.

[73] Assignee: Spectronics, Inc., Richardson, Tex.

[21] Appl. No.: 961,670

[22] Filed: Nov. 17, 1978

[51] Int. Cl.³ .......................... G02B 5/16; B05D 5/04
[52] U.S. Cl. .................................. 350/96.22; 65/3 C;
350/96.23; 350/96.34; 427/163; 428/361
[58] Field of Search .............. 350/96.20, 96.21, 96.22,
350/96.23, 96.30, 96.34; 156/330, 333; 427/163,
165, 169; 428/421, 422, 361; 65/3 C

[56] References Cited

U.S. PATENT DOCUMENTS

| | | | |
|---|---|---|---|
| 3,509,012 | 4/1970 | Marzocchi | 350/96.34 X |
| 3,779,627 | 12/1973 | Pinnow et al. | 350/96.34 X |
| 3,930,103 | 12/1975 | Chimura et al. | 428/361 |
| 3,993,834 | 11/1976 | Chimura et al. | 350/96.34 X |
| 4,080,045 | 3/1978 | Nakatsubo et al. | 65/3 C X |

FOREIGN PATENT DOCUMENTS 2805667 8/1978 Fed. Rep. of Germany ........ 350/96.21
1037498 7/1966 United Kingdom ................. 350/96.34

*Primary Examiner*—John K. Corbin
*Assistant Examiner*—John D. Lee
*Attorney, Agent, or Firm*—Kanz & Timmons

[57] ABSTRACT

Disclosed is an optics cable including a plurality of optically transmissive fibers with the portions adjacent the terminal ends thereof clad with a copolymer of vinylidene fluoride and a fluoroplastic. The copolymer contains a minor proportion of a coupling agent which permits bonding of the clad fiber ends together and to terminal hardware so that the ends of the fibers are rigidly secured in a fixed relationship with each other and the terminal hardware.

10 Claims, 2 Drawing Figures

U.S. Patent   Apr. 28, 1981   4,264,129

FIBER BUNDLE TERMINATION

This invention relates to optical fiber bundles commonly referred to as optics cables. More particularly, it relates to methods for forming fiber bundle end faces and connections (hereinafter referred to as terminations) and to the improved terminations produced thereby.

Flexible fibers of optically transmissive material such as glass are commonly used as flexible conduits for conducting optical signals. In order to conduct optical energy by total internal reflection, such fibers must be clad with a material which exhibits an index of refraction lower than the index of refraction of the fiber. Conventionally, fused silica fibers are used which are clad with a coating of plastic which is usually a silicone. A plurality of such clad fibers may be arranged parallel and used as a flexible cable, known as an optics cable, for conducting optical energy.

In order to efficiently interconnect the flexible cables with other cables, scramblers, input and output stations and the like, the end of the cable must be terminated in an end face at which the ends of all fibers terminate in a single plane normal to the longitudinal axis of each fiber. To achieve a termination approximating the desired conditions, the ends of the fibers are bound in a suitable retainer and simultaneously cut or broken at a point approximating the desired terminal face. The end of the fibers are then simultaneously polished to form a flat end face.

The conventional procedure is sometimes acceptable for optical systems wherein high optical loss is of no concern or wherein the terminal connectors are not subjected to mechanical stress or variations in temperature. However, because of the physical characteristics of most silicones used for cladding material, various problems are encountered in polishing the end faces of the fibers. Since the cladding material is relatively soft and elastic, the ends of the fibers are not maintained in a fixed relationship with respect to each other during polishing. Therefore the ends are not polished to optimum flatness and sometimes tend to chip. Furthermore, the polishing grit becomes embedded in the soft cladding material, thus altering its optical and mechanical characteristics.

Since the cladding material is relatively soft and pliable, it is difficult if not impossible to reliably hold the ends of the fibers in a terminal connector by mechanical force. Accordingly, when the cable is subjected to tensile stress or temperature changes, some of the fibers move with respect to the other fibers and the connector, thus resulting in misalignment of the end faces of the fibers. This condition cannot be readily rectified by bonding the clad fibers together or to the connector since few materials readily bond to silicone plastics.

In accordance with the present invention, an optics cable termination is formed in which the terminal ends of all the fibers in an optics cable are bonded together and are also bonded to the terminal connector hardware. The termination is formed by removing the silicone plastic cladding from the terminal ends of the fibers and replacing the silicone cladding with a cladding film comprising a copolymer or vinylidene fluoride and a fluoroplastic selected from the group consisting of tetrafluoro ethylene and chlorotrifluoro ethylene. The reclad fibers are then bonded together and to the connector hardware with an epoxy bonding material. A coupling agent is included in the copolymer solution which aids in bonding the fluoroplastic copolymer to the fibers and to the epoxy bonding material.

Optics cables of various conventional design are readily available. Such cables generally comprise a plurality of flexible fibers of optically transmissive material, such as fused silica glass, which are clad on their longitudinal outer surfaces with a cladding material having a lower index of refraction than the glass. The clad fibers are arranged parallel and closely packed. Generally the glass fibers are circular in cross section and closely packed into a bundle forming a cable which is also generally circular in cross section. In various other arrangements the fibers may be arranged in circular or ring patterns or any other desired configuration, depending upon the application for which the optics cable is to be used. The bundle of fibers is usually encased in a cable jacket and includes terminal connectors at each end to mechanically interconnect and optically couple the input/output face of the optics cable with other optical components such as scramblers, other cables, input or output stations and the like. Ordinarily, the optics cable is encased in a suitable protective jacket which may include a strengthening jacket member to add tensile strength to the cable and limit the bending radius of the cable to prevent breakage of the fibers.

Figure 2:
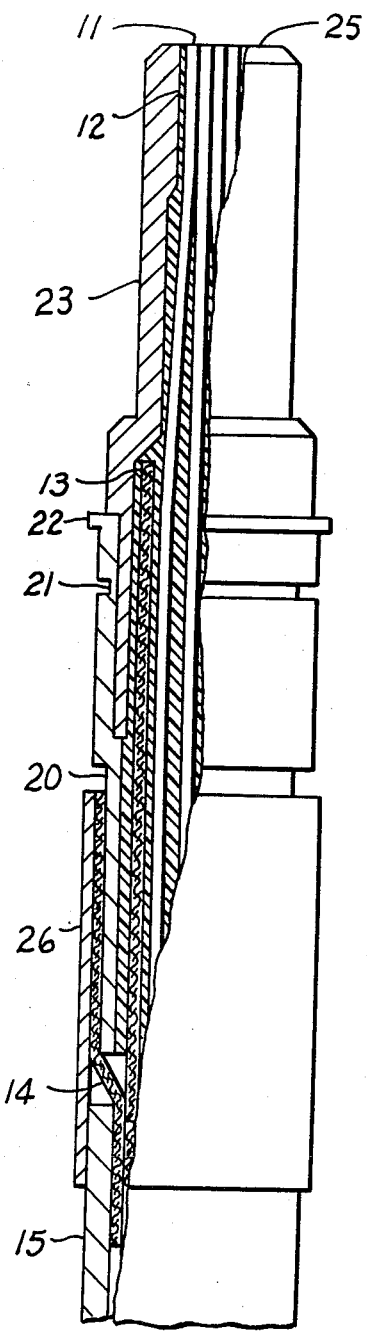

The features and advantages of the invention will become more readily understood from the following detailed description taken in connection with the appended claims and attached drawings in which:

FIG. 1 is a partially sectional view of a conventional optics cable partially stripped in preparation for forming a fiber bundle termination in accordance with the invention; and FIG. 2 is a partially sectional view of a fiber bundle termination formed in accordance with the invention.

A conventional optics cable with the end terminal connector removed is illustrated partially in section in FIG. 1. The cable comprises a plurality of optical fibers 11, each individually coated with a silicone plastic cladding material 12. The clad fibers 11 are closely packed within a tubular sheath or inner jacket 13. The inner jacket 13 is surrounded by a strength jacket 14 which is usually a coaxial braided high strength fabric jacket such as Kevlar. The strength jacket 14 is surrounded by a coaxial outer jacket 15 which serves mainly as a nonconductive, relatively inert protective casing.

In order to act as an effective optical conduit, the end faces of the individual fibers 11 must terminate in a common plane perpendicular to the axes of the fibers. Furthermore, in order to maintain total internal reflection throughout the length of the fibers and prevent loss of optical energy, each fiber must be fully clad over its entire length with a material having a lower index of refraction than the fiber itself. In order to position the terminal end face so as to permit coupling of optical energy to and from the cable with a second optical member such as as scrambler, input station or output station, means must be provided to maintain the individual fiber ends in a common termination plane and closely packed while maintaining the common termination plane in fixed relationship with the input/output face of the optical device with which it is in optical communication. For this purpose a coupling ferrule (not shown in FIG. 1) is ordinarily attached to the cable jacket and surrounds the terminal end of the optical fibers.

The silicone plastic cladding material conventionally used on fused silica glass fibers provides excellent optical properties and adheres relatively well to fused silica glass fibers. However, the conventional silicone plastic films are quite elastic and pliable and cannot be readily bonded together with conventional epoxies. Accordingly, it is difficult to maintain the individual fibers in a fixed spatial relationship if tensile stress is applied to the optics cable. Also, when polishing the terminal ends of the fibers 11 to form a common input/output face, the fiber ends tend to move and are easily chipped.

In accordance with the present invention a termination is formed in an optics cable as described hereinabove by removing the silicone plastic cladding material from the terminal ends of the fibers and substituting therefore a fluoroplastic copolymer.

The preferred process for forming the termination of the invention is described hereinafter with reference to FIGS. 1 and 2. As shown in FIG. 1 the terminal end of the outer jacket 15 is removed from the optics cable to expose the strengthening jacket 14. A shorter portion of the terminal end of the strengthening jacket 14 is removed to expose the inner jacket 13. An even shorter portion of the inner jacket 13 is removed to expose a length of approximately five to ten centimeters of each clad fiber 11 adjacent its terminal end. The exposed ends of the fibers 11 are separated and temporarily maintained in a spread condition by a suitable spreader jig or the like.

If the clad fibers are individually contained in buffer jackets, the buffer jackets must be removed. This may be readily accomplished by heating the buffer jacket with a forked heating element such as a hot wire or soldering iron to cut the buffer jacket at a point approximately five to ten centimeters from the end of the fiber. The cut end of the buffer jacket may then be readily mechanically stripped from the clad fiber. The cladding may then by stripped from the exposed ends or the fibers by dipping the ends in a suitable solvent.

The silicone plastic ordinarily used for cladding material is readily removed from the fibers by immersing the ends of the clad fibers in concentrated sulfuric acid. In most cases glass fibers are fully stripped and cleaned by immersion in concentrated sulfuric acid for about five minutes at room temperature. Care should be exercised to prevent contact of the stripping solvent with the buffer jacket. In the preferred practice of the invention, the cladding material is stripped from the fiber to within no more than about one millimeter of the end of the buffer jacket. After the cladding material has been stripped from the fibers, the exposed ends are rinsed in distilled water to remove any acid or other stripping agent therefrom and dried in hot air. The fiber ends are then ready for recladding.

Copolymers of fluroplastics have been found to be suitable material for replacement of the silicone plastics conventionally used for cladding materials. Highly fluorinated fluoroplastics generally have a lower index of refraction than fused silica glass and adhere to the glass to form a cladding film, the more highly fluorinated plastics generally exhibiting lower indices of refraction. Furthermore, fluroplastics are less elastic than silicone plastics and are more readily bonded to other organic materials such as epoxies and the like, thus and more suited to binding the ends of the fibers in a termination and terminal connector than are silicone plastics. The fluoroplastics are, however, generally somewhat less suitable than conventional silicone plastics for use as a cladding material on fused silica fibers because they tend to form cloudy films. The cloudy films appear to be somewhat granular when compared to ordinary silicone plastics and the cloudy film causes a small amount of radiation loss or attenuation. Therefore, cladding the fibers over the full length of an optics cable with fluoroplastics would ordinarily produce a cable which is less efficient than one using coventional silicone plastics. However, the loss of efficiency is quite small and may be ignored where only a small length of the total fiber is concerned. Therefore, using fluoroplastic cladding on only the terminal portion (usually about one to two centimeters) produces no measurable loss in efficiency of the overall cable. However, the ability of fluoroplastics to bond to both the inorganic glass and the organic epoxy used to bind the clad fibers in a terminal connector make fluoroplastics far superior to silicone plastics for use as a cladding material at the terminal ends.

A copolymer of about 20 to 30 mole percent vinylidene fluoride and tetrafluoro ethylene has been found most suitable for cladding the terminal ends. In the preferred practice of the invention, a copolymer comprising 23 to 28 mole percent vinylidene fluoride and 72 to 77 mole percent tetrafluoro ethylene is dissolved in acetone to form a solution comprising 75 to 80 weight percent acetone and 20 to 25 weight percentcopolymer. The glass fibers are dipped into the solution and slowly withdrawn, leaving a film of solution on the fibers. The fiber ends are then allowed to dry in room temperature air for about two minutes. The cladding film will usually appear somewhat cloudy at this point. Futher drying in air heated to about 150° C. to about 180° C. for about ten to twenty-five seconds causes the copolymer to fuse and form a relatively clear film. Other fluoroplastics may be substituted for tetrafluoro ethylene in approximately the same proportions with similar results. However, as the fluoridation of the plastic decreases the index of refraction of the fluoroplastic increases.

The numeric aperture for conventional plastic-clad fused silica fibers generally falls in the range of about 0.25 to about 0.40. Since $$NA = \sqrt{n_1^2 - n_2^2}$$

where

NA = numeric aperture,
$n_1$ = refractive index of fiber and
$n_2$ = refractive index of cladding, the substitute cladding must have an index of refraction less than 1.43 to keep the numeric aperture of the reclad end portions in the same range as the remainder of the clad fiber. Accordingly, the copolymers found most suitable for recladding the ends of the fibers in accordance with the invention have been found to be copolymers of vinylidene fluoride and tetrafluoro ethylene or chlorotrifluoro ethylene.

After the fibers 11 have been reclad with the fluoroplastic as described above, the terminal interconnection assembly is attached to the end of the cable as illustrated in FIG. 2. To securely bind the terminal ends of the fibers within the end termination hardware, the end of the cable, including reclad fibers 11, and the portion of the inner jacket 13 extending past the strength jacket 14 is immersed in a suitable epoxy bonding material. For this purpose Eccobond 45-LV-FR with catalyst 15LV available from Emerson and Cuming has been found suitable. This epoxy is a low viscosity filled adhesive designed for adhesion to rigid and semi-flexible materials. Various other epoxy bonding materials may also be suitable.

The end of the cable, including the exposed inner jacket 13, is inserted into a tubular connector housing 20 which has an external annular groove 21 and radially extending terminal flange 22 suitable for mating with conventional cable interconnection hardware. The terminal end of tubular connector housing 20 has an enlarged internal diameter adapted to telescopically mate with the end of a tubular pin connector 23. Pin connector 23 is telescoped within the terminal end of tubular connector housing 20 so that the reclad fibers are snugly confined therewithin and extend at least to the terminal end face 25.

The strength jacket 14 is drawn over the inner end of tubular connector housing 20 and secured thereto by a crimp sleeve 26. After assembly the epoxy is cured, resulting in a fully assembled termination wherein the optical fibers 11 are individually clad with a material having an index refraction lower than the index refraction of the fibers, the reclad terminal end portions having approximately the same numeric aperture as the remainer of the fiber. Furthermore, the epoxy bonding material permanently secures the reclad fibers together in the terminal end of the pin connector 23 and likewise bonds the reclad fibers to the pin connector 23. The epoxy bonding material also bonds the cable inner jacket 13 to the internal surfaces of the tubular housing 20 and the pin connector 23 and fills the space between the silicone plastic clad fibers lying within the tubular connector housing 20. Accordingly, the optical fibers are securely stabilized and bound together and retained within the terminal connection hardware. After the epoxy has been properly cured, the end face 25 may be optically polished by conventional means to provide a terminal end input/output face perpendicular to the axes of the optical fibers with the terminal ends of the fibers lying in a common plane.

In accordance with the invention bonding of the fluoroplastic cladding material to the glass fibers and to the epoxy used for bonding the clad fibers together at the termination and to the terminal connector is greatly enhanced by using a coupling agent which does not adversely affect the optical characteristics of the fluoroplastic.

Most conventionally available coupling agents are not soluble in solvents in which the fluoroplastics are soluble. Accordingly, while coupling agents would at first appear to be advantageous, practical use thereof presents difficulties. It has been discovered, however, that N-β-aminoethyl-γ-aminopropyl trimethoxysilane may be used as coupling agent for the above-noted fluoroplastics under certain conditions. This coupling agent is commercially available under the trade name Dow Corning Z-6020 Silane from Dow Corning Corporation, Midland, Michigan and, when applied dissolved in water, will combine with both organic and inorganic materials. The fluoroplastics used in forming the reclad material, however, are not soluble in water. In fact, no acceptable common solvent has been found for both the coupling agent and the fluoroplastic. It has been discovered, however, that the coupling agent noted above is soluble in methanol. The fluoroplastics are soluble in acetone. Since methanol is soluble in acetone, the coupling agent may be first dissolved in methanol and the solution thereof dissolved in an acetone solution of the fluoroplastic to provide a solution of copolymer fluoroplastic which will form a cladding film containing a coupling agent.

In the preferred practice of the invention a 3% solution of N-β-aminoethyl-γ-aminopropyl trimethoxysilicane in methanol is added to the acetone solution of fluoroplastic polymers in an amount sufficient to comprise about 0.3 weight percent of the final solution. The cladding film produced therefrom retains the optical characteristics of the copolymer but also exhibits excellent bonding characteristics, thereby causing the cladding film to be adherently bonded to the glass fibers and permitting the cladding material to adherently bond to the epoxy bonding material during the final assembly step. The fluoroplastic cladding film containing the coupling agent adheres very strongly to the glass fibers and has a numeric aperture approximating that of the silicone plastic. The substitute cladding forms a clear film which also adheres well to the silicone cladding at the junction between the original silicone cladding and the substitute cladding.

By dipping the fiber ends into the cladding solution a sufficient depth to permit the end of the remaining silicone cladding to be fully submerged, the substitute cladding forms a film over the end of the original cladding and forms a continuous extension of the original cladding to the terminal end of the fiber. The reclad portions, however, are much more adherent to epoxies. Therefore, the reclad end portions may be readily bonded together and to the termination hardware by simply dipping the reclad ends in the desired epoxy bonding material.

The flouorplastic cladding of the invention is much less pliable and elastic than silicone plastic. Accordingly, with the reclad terminal ends rigidly bonded together and to the terminal connector 23, the end face 25 may be polished by conventional means to form an end face with the terminal end faces of each fiber lying in a common plane normal to the axes of the fibers at the end face. Since the reclad material is less elastic, the ends are rigidly secured by the epoxy bonding material and may be readily polished without chipping. Furthermore, the polished end faces are uniformly normal to the axes of the fibers and the polishing grit does not become embedded in the cladding or the epoxy.

Since the reclad ends are uniformly bonded together and to the terminal pin connector 23, tensile applied to the optics cable by way of connector housing 20 has no effect on the position of the end faces relative to each other. The ends of the fibers are commonly bound, thus tensile stress on the cable is evenly applied to all the fibers at the end of the cable and no fiber ends may become misaligned.

While the invention has been described with particular reference to a specific configuration of glass fibers in a specific terminal arrangement, it will be recognized that the invention is not so limited. It is to be understood that the form of the invention shown and described in detail is to be taken as the peferred embodiment of same, and that various changes and modifications may be resorted to without departing from the spirit and scope of the invention as defined by the appended claims.

What is claimed:

1. An optics cable including a plurality of optically transmissive flexible fused silica fibers individually clad with a material having an index of refraction lower than the index of refraction of said fibers, at least on terminal end of each of said fibers clad with a continuous coating of a copolymer of vinylidene fluoride and a fluoroplastic selected from the group consisting of tetrafluoro ethylene and chlorotrifluoro ethylene containing a coupling agent.

2. An optics cable as defined in claim 1 wherein said coupling agent is N-β-aminoethyl-γ-aminopropyl trimethoxysilane.

3. An optics cable as defined in claim 1 including a terminal end connector surrounding the terminal ends of said fibers wherein said clad fibers are bonded together and to said terminal end connector.

4. An optically transmissive flexible fiber of fused silica having a continuous cladding surrounding the longitudinal external surface thereof, said cladding comprising a film of silicone plastic over a major portion of the length of said fiber and a continuous film of fluoroplastic containing a coupling agent over the portion of said fiber adjacent at least one end thereof.

5. An optically transmissive fiber as defined in claim 4 wherein the numerical aperture of the portion of said fiber clad with said fluoroplastic is approximately the same as the numerical aperture of the portion of said fiber clad with said silicone plastic.

6. An optically transmissive flexible fiber as defined in claim 4 wherein said fluoroplastic is a copolymer of vinylidene fluoride and a fluoroplastic selected from the group consisting of tetrafluoro ethylene and chlorotrifluoro ethylene.

7. An optically transmissive flexible fiber as defined in claim 6 wherein said coupling agent is N-β-aminoethyl-γ-aminopropyl trimethoxysilane.

8. The method of forming a continuous cladding of fluoroplastic on an optically transmissive fiber comprising the steps of
 (a) dissolving vinylidene fluororide and a fluoroplastic selected from the group consisting of tetrafluoro ethylene and chlorotrifluoro ethylene in acetone to form a cladding solution,
 (b) dissolving a coupling agent in a solvent which is soluble in acetone to form a coupling agent solution,
 (c) dissolving said coupling agent solution in said cladding solution, and
 (d) uniformly applying said cladding solution to said optically transmissive fiber.

9. The method set forth in claim 8 wherein said coupling agent is N-β-aminoethyl-γ-aminopropyl trimethoxysilane and is dissolved in methanol.

10. In an optics cable including a plurality of optically transmissive flexible fused silica fibers, a fiber bundle termination wherein the portion adjacent the terminal end face of each fiber in said cable is individually clad with a copolymer of vinylidene fluoride and a fluoroplastic selected from the group consisting of tetrafluoro ethylene and chlorotrifluoro ethylene containing a minor proportion of a coupling agent and said portions are bound to each other and to a housing surrounding said portion with an epoxy.

* * * * *

UNITED STATES PATENT AND TRADEMARK OFFICE
CERTIFICATE OF CORRECTION

PATENT NO. : 4,264,129
DATED : April 28, 1981
INVENTOR(S) : RONNIE L. WARKENTINE It is certified that error appears in the above-identified patent and that said Letters Patent are hereby corrected as shown below:

In Column 1, line 29, "end" should read ---ends---

In Column 4, line 27, "percentcopolymer" should read ---percent copolymer---

In Column 6, lines 4 and 5, "trimethoxysilicane" should read ---trimethoxysilane--- line 46, "tensile applied" should read ---tensile stress applied--- line 66, "on" should read ---one---

In Column 8, line 30, "portion" should read ---portions---

UNITED STATES PATENT AND TRADEMARK OFFICE
CERTIFICATE OF CORRECTION

PATENT NO. : 4,264,129

DATED : April 28, 1981

INVENTOR(S) : RONNIE L. WARKENTINE

It is certified that error appears in the above-identified patent and that said Letters Patent are hereby corrected as shown below:

In Column 2, line 59, "as as" should read ---as a---

In Column 3, line 16, "therefore" should read ---therefor---

In Column 5, line 20, "index" (both occurences) should read ---index of--- line 23, "remainer" should read ---remainder---

Signed and Sealed this

Third Day of November 1981

[SEAL]

Attest:

GERALD J. MOSSINGHOFF

*Attesting Officer*     *Commissioner of Patents and Trademarks*